(12) United States Patent
Gandhi (10) Patent No.: US 8,167,363 B2
(45) Date of Patent: May 1, 2012

(54) PRESTRESSED STRUCTURAL MEMBERS AND METHODS OF MAKING SAME

(75) Inventor: Umesh N. Gandhi, Farmington Hills, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 78 days.

(21) Appl. No.: 12/424,061

(22) Filed: Apr. 15, 2009

(65) Prior Publication Data
US 2010/0264693 A1 Oct. 21, 2010

(51) Int. Cl.
*B60J 7/00* (2006.01)
(52) U.S. Cl. ............. 296/203.01; 296/187.01; 428/221; 29/897.2
(58) Field of Classification Search ............. 296/203.01, 296/187.01; 428/221; 29/446, 447, 452, 29/897.2
See application file for complete search history.

(56) References Cited

U.S. PATENT DOCUMENTS

| | | | |
|---|---|---|---|
| 5,046,778 A | 9/1991 | Larsen | |
| 5,213,391 A | 5/1993 | Takagi | |
| 5,344,208 A | 9/1994 | Bien et al. | |
| 5,755,486 A | 5/1998 | Sycech | |
| 5,804,608 A | 9/1998 | Nakazato et al. | |
| 5,806,919 A | 9/1998 | Davies | |
| 5,845,937 A | 12/1998 | Smith | |
| 5,992,923 A | 11/1999 | Wycech | |
| 6,193,303 B1 | 2/2001 | Urushiyama et al. | |
| 6,406,078 B1 | 6/2002 | Wycech | |
| 6,419,305 B1 | 7/2002 | Larsen | |
| 6,471,285 B1 | 10/2002 | Czaplicki et al. | |
| 6,474,723 B2 | 11/2002 | Czaplicki et al. | |
| 6,482,486 B1 | 11/2002 | Czaplicki et al. | |
| 6,555,767 B1 | 4/2003 | Lockery et al. | |
| 6,619,727 B1 | 9/2003 | Barz et al. | |
| 6,641,208 B2 | 11/2003 | Czaplicki et al. | |
| 6,668,457 B1 | 12/2003 | Czaplicki | |
| 6,910,714 B2 | 6/2005 | Browne et al. | |
| 6,928,736 B2 | 8/2005 | Czaplicki et al. | |
| 7,194,804 B2 | 3/2007 | Czaplicki | |
| 7,401,845 B2 | 7/2008 | Alexander et al. | |
| 2002/0053179 A1 | 5/2002 | Wycech | |
| 2002/0066254 A1 | 6/2002 | Ebbinghaus | |
| 2002/0175537 A1 | 11/2002 | Cress | |
| 2004/0056470 A1 | 3/2004 | Valdez | |
| 2006/0125291 A1* | 6/2006 | Buravalla et al. | ............ 296/204 |
| 2007/0092685 A1 | 4/2007 | Yamazaki | |
| 2007/0273174 A1 | 11/2007 | Abraham et al. | |
| 2008/0093888 A1 | 4/2008 | Baumann | |
| 2008/0197674 A1 | 8/2008 | Browne et al. | |

FOREIGN PATENT DOCUMENTS

| | | |
|---|---|---|
| GB | 1474696 | 5/1977 |
| JP | 11291951 | 10/1999 |
| WO | 20060062608 | 6/2006 |
| WO | 20060104862 | 10/2006 |

OTHER PUBLICATIONS

International Search Report for corresponding PCT Intl. Appln. No. PCT/US2010/0031204, mailed May 31, 2010.

* cited by examiner

*Primary Examiner* — Joseph Pape
(74) *Attorney, Agent, or Firm* — Dinsmore & Shohl LLP (57) ABSTRACT

Methods of prestressing a vehicle structural member include forming a support structure, applying a preformed reinforcing component to the support structure, the preformed reinforcing component having a size changing material that changes in dimension upon application of a stimulus and transforming the preformed reinforcing component from a first configuration to a second configuration.

15 Claims, 7 Drawing Sheets

PRESTRESSED STRUCTURAL MEMBERS AND METHODS OF MAKING SAME

TECHNICAL FIELD

The present invention generally relates to reinforced structures and methods of reinforcing structures and, more specifically, to prestressing structural members using reinforcing components.

BACKGROUND

Vehicle body structures are provided to absorb or deflect loads imposed on the vehicle. Often, such vehicle body structures are formed of metal, which may tend to provide increased weight to the vehicle. It may be desirable to use relatively lightweight, reinforced structures, where possible, to reduce vehicle weight and load on various vehicle components.

SUMMARY

In one embodiment, a method of prestressing a vehicle structural member includes forming a support structure; identifying one or more locations where the support structure will be in compression during use; applying a preformed reinforcing component to the support structure, the preformed reinforcing component comprising a size changing material that changes in dimension upon application of a stimulus; transforming the preformed reinforcing component from a first configuration where the size changing material has a first dimension to a second configuration where the size changing material has a second dimension different from the first dimension, the preformed reinforcing component being applied to the support structure such that transforming the preformed reinforcing component from the first configuration to the second configuration increases tensile stress in the support structure at the one or more locations.

In another embodiment, a prestressed vehicle structural member includes a support structure. A preformed reinforcing component is connected to the support structure with the preformed support structure in a first configuration. The preformed reinforcing component includes a size changing material that changes in dimension upon application of a stimulus. The preformed reinforcing component being transformed from the first configuration where the size changing material has a first dimension to a second configuration where the size changing material has a second dimension different from the first dimension. The preformed reinforcing component is connected to the support structure such that the preformed reinforcing component increases tensile and/or compressive stress in the support structure with the preformed reinforcing component in the second configuration.

In another embodiment, a method of vehicle assembly using a vehicle structural member includes forming a support structure; identifying one or more locations where the support structure will be in compression during use; forming a reinforcing component of a shape memory polymer having a permanent shape and a temporary shape; applying the reinforcing component in the temporary shape to the support structure; applying the vehicle structural member to a vehicle during vehicle assembly; and transforming the reinforcing component from the temporary shape to the permanent shape, the reinforcing component being applied to the support structure such that transforming the reinforcing component from the temporary shape to the permanent shape increases tensile stress in the support structure at the one or more locations.

These and additional features provided by the embodiments of the present invention will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Referring to the figures, portions of a vehicle body 10 for a vehicle are illustrated which may be formed of reinforced vehicle structural members that are prestressed using one or more preformed reinforcing components. The term "vehicle structural members" may refer to any of a number of various parts or portions thereof that form a vehicle 12, such as pillars, rails, framing members, bumper components, etc. The vehicle structural members may be formed of multiple components, such as wall structures, sleeves, tubes, etc. with one or more preformed reinforcing components such as inserts or insets. The vehicle structural members may be formed of various materials such as metal, glass, plastic, etc. The term "preformed reinforcing component" refers to a reinforcing component that is formed into a shape prior to being positioned for forming the vehicle structural member. For example, the preformed reinforcing component may be molded, extruded, pressed, machined, etc. into a shape prior to being positioned for forming the vehicle structural member. The term "prestress" means that internal stresses have been introduced to the vehicle structural member that may counteract stresses that resulting from an applied load.

The vehicle structural members may generally include a structural component, such as a wall structure, tube, sleeve, etc. formed of a first material, such as a metal, and the preformed reinforcing component, such as an insert or inset formed of a second, different material such as a plastic. The preformed reinforcing component may be formed of a size changing material that changes in dimension upon application of a stimulus, such as heat, electricity, etc. The preformed reinforcing component may be selected and be affixed to the structural component such that when the preformed reinforcing component changes in dimension, stresses are introduced to the structural component.

Figure 1:
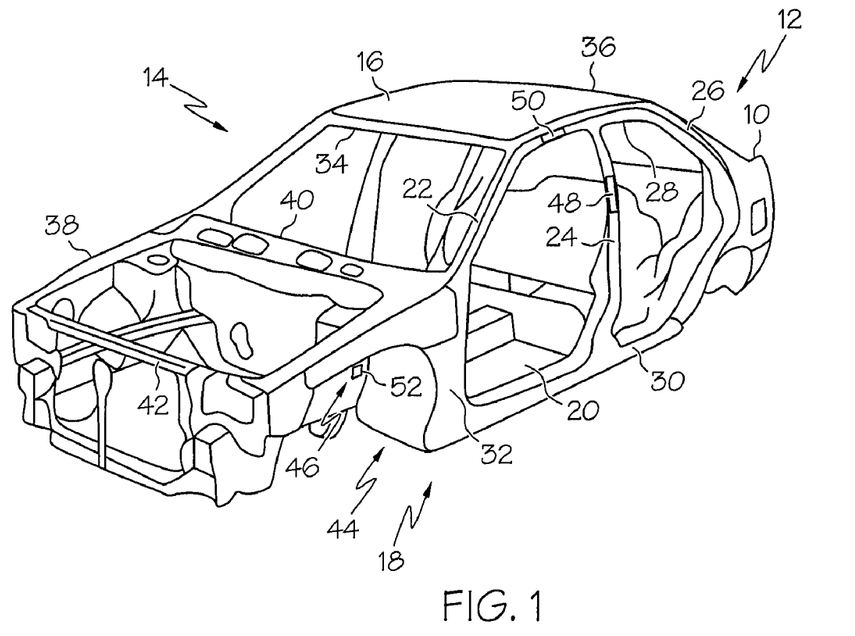
FIG. 1 is a perspective view of an embodiment of a vehicle body.

Referring to FIG. 1, the vehicle body 10 includes an upper vehicle portion 14 with a roof 16 and a lower vehicle portion 18 with a floor 20. Between the upper vehicle portion 14 and the lower vehicle portion 18 are an A pillar 22, a B pillar 24 and a C pillar 26 (indicated on one side of the vehicle body). The vehicle body 10 may include more or less pillars than the illustrated A pillar 22, B pillar 24 and C pillar 26, such as a D pillar. The A pillar 22, B pillar 24 and C pillar 26 extend between a side roof rail 28 and a floor rocker beam 30. A hinge pillar 32 meets the A pillar 22 and the side roof rail 28 extends between a front header 34 and a rear header 36. Also connected to the hinge pillar 32 are longitudinal rails 38 of an engine cradle. The longitudinal rails 38 meet an instrument panel beam 40 and front tie bars 42 of the engine cradle. A tire blocker 44 and a kickup portion 46 may also be provided.

Vehicle structural members 48, 50 and 52 may be used at any suitable location, such as at any of those described above including any joints therebetween to form the vehicle body 10. For example, vehicle structural member 48 is part of the B pillar 22, vehicle structural member 50 is part of the side roof rail 28 and vehicle structural member 52 is part of the kickup portion 46. The vehicle structural members 48, 50 and 52 are provided for resistance to bending and crushing while being lightweight compared to structural members formed of solid metal.

Figure 2:
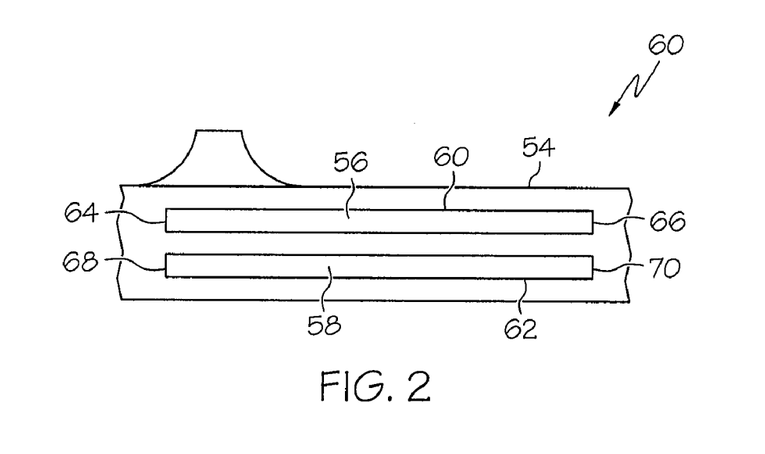
FIG. 2 is a diagrammatic side view of an embodiment of a vehicle structural member.

The vehicle structural members 48, 50 and 52 may be prestressed, which may increase the load capacity of the vehicle structural members. FIG. 2 is a diagrammatic illustration of vehicle structural member 50, which includes a structural component 54 and preformed reinforcing components 56 and 58. The wall thickness of the structural component 54 maybe about two mm or less, such as about one mm. The preformed reinforcing components 56 and 58 are each in the form of strips that are located within grooves 60 and 62 that extend along a length of the structural component 54. The preformed reinforcing components 56 and 58 may be seated against end surfaces 64, 66 and 68, 70 of the grooves 60 and 62. In some embodiments, the end surfaces 64, 66 and 68, 70 may provide locations where the preformed reinforcing components 56 and 58 can apply forces to the structural component 54 thereby prestressing the structural component. While two grooves 60 and 62 and two preformed reinforcing components 56 and 58 are shown, more or less than two grooves and preformed reinforcing components may be used. The grooves 60 and 62 may be formed by removing material forming the structural component 54. In some embodiments, the structural component 54 is formed of metal, such as steel, aluminum, an alloy, etc. Removing the metal material can reduce the overall weight of the vehicle structural member 50. In some embodiments, a resin or other adhesive material may be used to affix the preformed reinforcing components 56 and 58 within the grooves 60 and 62.

Figure 3A:
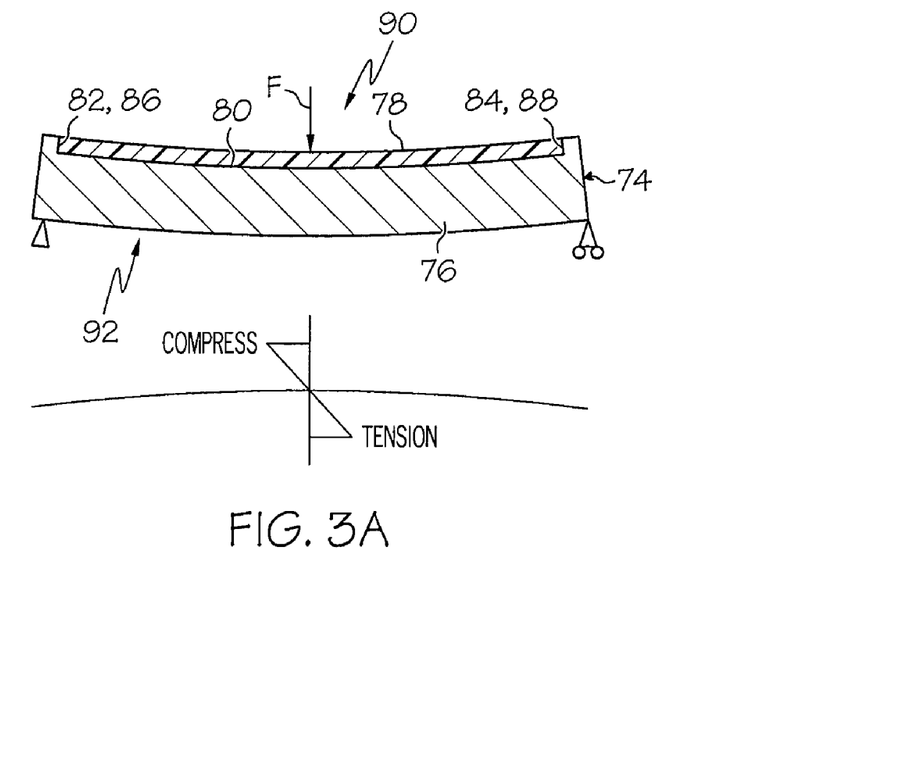
FIGS. 3A-3C are diagrammatic representations of a prestressing process.
Figure 3B:
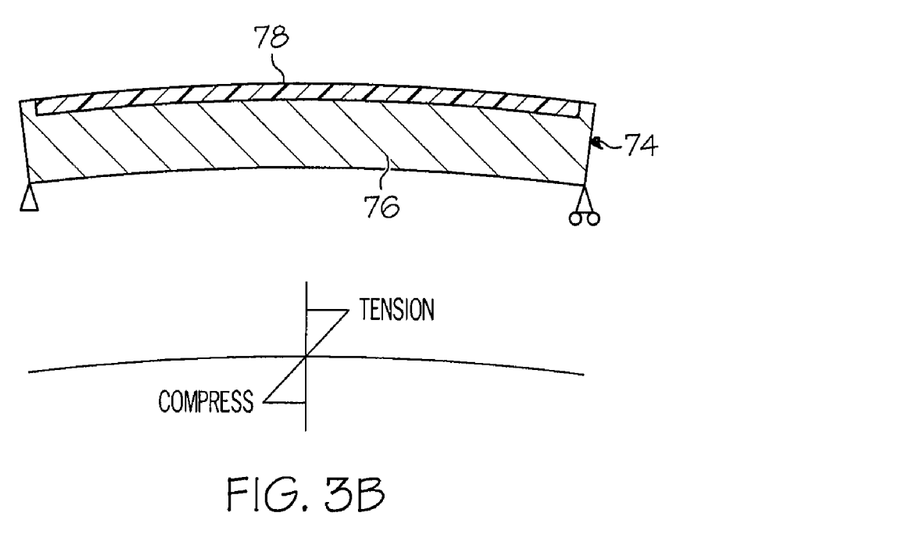
Figure 3C:
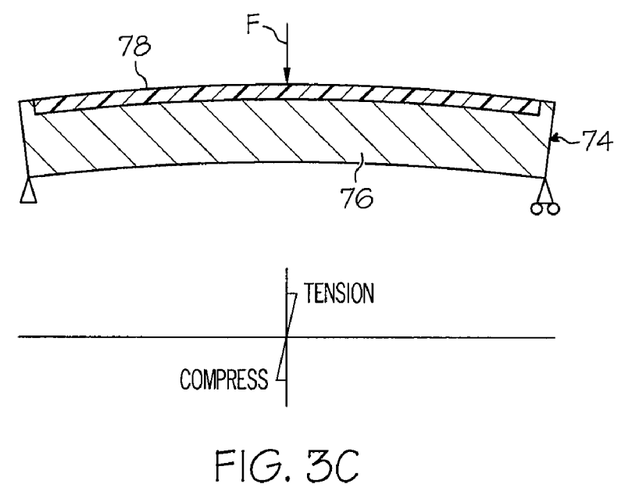

FIGS. 3A-3C diagrammatically illustrate the operation of a prestressed vehicle structural member 74 for illustrative purposes. The vehicle structural member 74 includes a structural component 76 and a preformed reinforcing component 78 located within a groove 80 formed in the structural component. The preformed reinforcing component 78 has ends 82 and 84 that are seated against respective surfaces 86 and 88 of the groove 80. FIG. 3A illustrates the vehicle structural member 74 before prestressing under an applied stress. As can be seen, portion 90 of the vehicle structural member 74 is under compression and portion 92 is under tension. Because it is more likely that the vehicle structural member 74 will fail under compression rather than under tension, the vehicle structural member 74 is prestressed. FIG. 3B illustrates the prestresses introduced using the preformed reinforcing component 78. The preformed reinforcing component 78 is formed of a material that changes in dimension upon application of energy, such as heat, electricity, etc. thereby introducing the stresses. The prestressing force acts as a tensile force in the structural component 76. FIG. 3C illustrates the composite vehicle structural member 74 prestressed and under the applied stress. As can be seen, the compressive stresses are reduced in the composite vehicle structural member 74 due to the prestresses introduced by the preformed reinforcing component 78. In some embodiments, there may be about 20 percent to about 30 percent improvement in moment carrying capacity compared to vehicle structural members without prestress.

FIGS. 3A-3C illustrate activation of the preformed reinforcing component 78 thereby causing a change in geometry of the preformed reinforcing component in a longitudinal direction (i.e., in the lengthwise direction of the structural component 76). The change of geometry of the preformed reinforcing component 78 in an outward direction causes bending of the composite vehicle structural member 74, which can increase crush resistance of the vehicle structural member.

Figure 4:
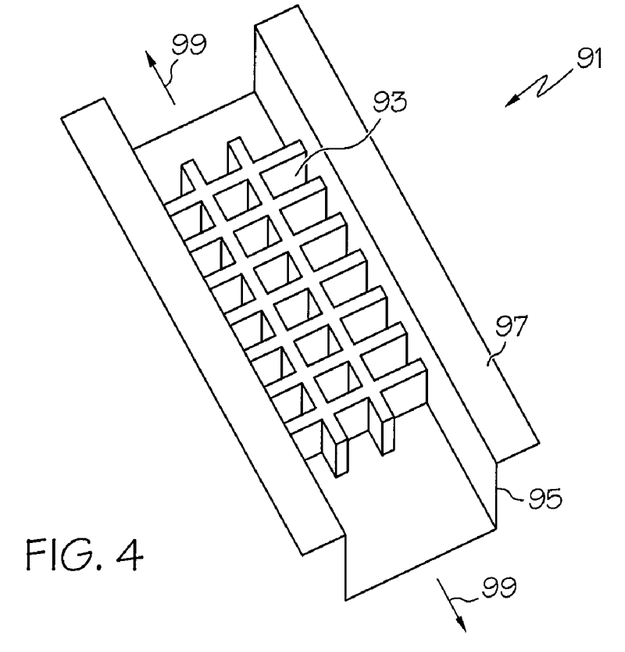
FIG. 4 illustrates another embodiment of a vehicle structural member.

Referring to FIG. 4, another vehicle structural member 91 includes a structural component 97 in the form of a hat member (e.g., formed by bending a metal sheet). The vehicle structural member 91 includes a preformed reinforcing component 93 (e.g., formed of a material different from material forming the structural component 97, such as a plastic). The preformed reinforcing component 93 is in the form of a comb-like structure that may be connected (e.g., adhered, fastened, etc.) to a base portion 95 of the vehicle structural member 91. In some embodiments, the reinforcing component 93 maybe formed of a material that expands lengthwise upon application of a stimulus (e.g., heat) to place the base portion in tension, as represented by arrows 99. In another embodiment, the reinforcing component 93 may be formed of a material that contracts lengthwise upon application of the stimulus to place the base portion 95 in compression. In the embodiment of FIG. 4, as an example, prestressing the hat section by 60 MPa in compression may result in an about 30 percent increase in load capacity (e.g., from about 449 kN-mm to about 584 kN-mm).

Figure 5A:
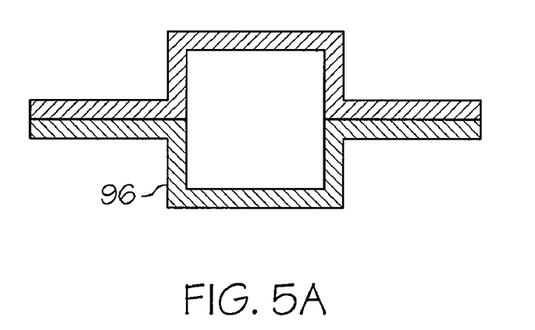
FIGS. 5A-5C are diagrammatic representations of another embodiment of a prestressing process.
Figure 5B:
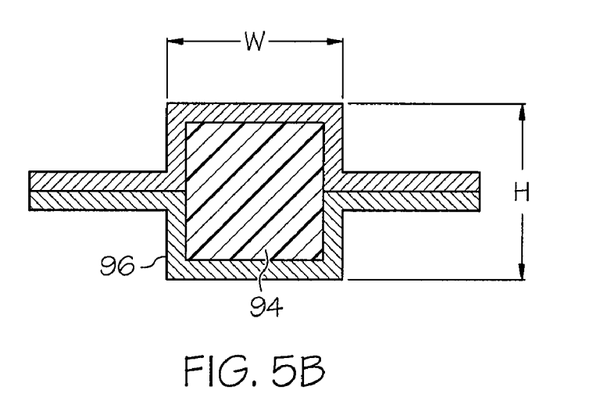
Figure 5C:
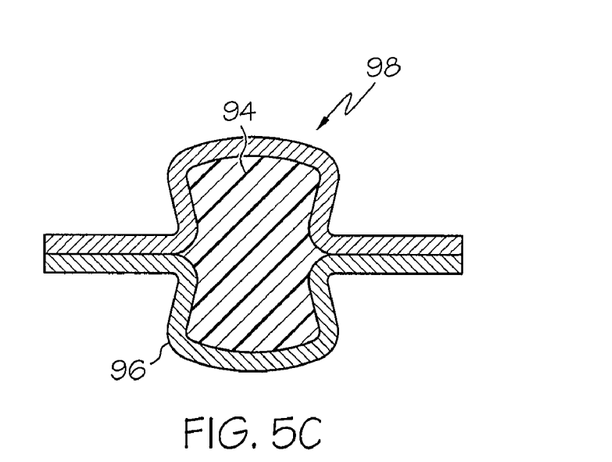

Referring now to FIGS. 5A-5C, a preformed reinforcing component 94 may be used to provide a change the cross-sectional geometry of a structural component 96 upon activation of the preformed reinforcing component. In this embodiment, the size changing material of the preformed reinforcing component 94 is selected to increase in cross-sectional size (e.g., width W and/or height H). Such a change in cross-sectional size of the preformed reinforcing component 94 results in prestresses applied in the structural component 96, which can increase crush resistance of vehicle structural member 98.

Figure 6A:
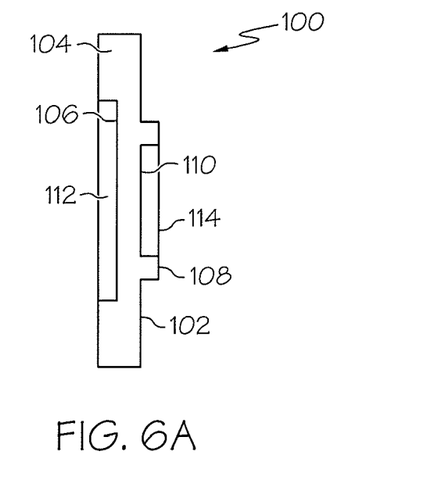
FIGS. 6A and 6B are diagrammatic representations of another embodiment of a prestressing process.
Figure 6B:
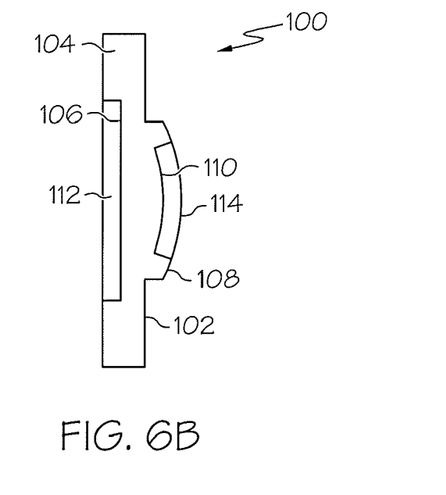

While FIGS. 3C-5C illustrate embodiments where the preformed reinforcing components 78 and 94 increase in size, preformed reinforcing components may be selected to decrease in size to introduce prestress in the structural component. For example, FIGS. 6A and 6B illustrate a vehicle structural member 100 including a structural component 102 having a first portion 104 with a first groove 106 and a second portion 108 with a second groove 110. A first preformed reinforcing component 112 is located in the first groove 106 and a second preformed reinforcing component 114 is located in the second groove 110. In this embodiment, the first preformed reinforcing component 112 includes a size changing material that decreases in size upon application of an activation stimulus and the second preformed reinforcing component 114 includes a size changing material that increases in size upon application of the activation stimulus. Referring to FIG. 6B, the first preformed reinforcing component 112 and the second preformed reinforcing component 114 cooperate to introduce prestress to the structural component 102.

Figure 7:
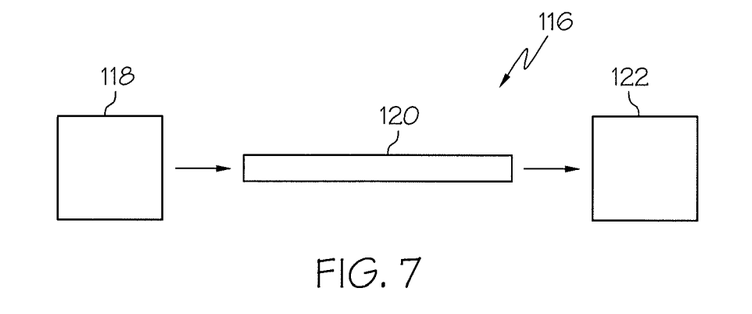
FIG. 7 illustrates an embodiment of programming a shape memory polymer.

Suitable size changing materials include shape memory polymers (SMPs). SMPs are polymeric materials which have the ability to return from a deformed state (temporary shape) to their original (permanent) shape induced by an external stimulus, such as a temperature change. A change in shape caused by a change in temperature may be referred to as a thermally induced shape-memory effect. FIG. 7 illustrates a process 116 of programming of an SMP and recovery of a shape. The programming process 116 may include any of heating a sample, deforming the sample and cooling the sample to provide a permanent shape 118. The permanent shape 118 may be stored while the sample is in a temporary shape 120. Applying a suitable external stimulus may induce the shape memory effect where the permanent shape 122 is restored. In some embodiments, heating the SMP above a transition temperature may induce the shape-memory effect. Cooling the SMP below the transition temperature may solidify the material. In some embodiments, there may be no recovery of the temporary shape, which may be referred to as one-way shape memory effect. Further programming, e.g., including mechanical deformation may be used to bring the SMP into a temporary shape again, which may not necessarily match the first temporary shape.

The permanent shape of an SMP can be set by melting or processing the SMP at a temperature higher than the highest thermal transition temperature for the SMP or its melting point, followed by cooling below that thermal transition temperature. In some embodiments, the temperature for setting the permanent shape of the SMP may be between about 100 degrees C. and about 300 degrees C. A temporary shape can be set by heating the SMP to a temperature higher than the thermal transition temperature, but lower than the highest thermal transition temperature or the melting point. The temporary shape is set by applying an external stress while processing the SMP above the thermal transition temperature followed by cooling to fix the temporary shape. With the SMP in the temporary shape, it may be applied to the structural component of the vehicle structural member. The SMP may then be reverted to the permanent shape by heating the SMP above the thermal transition temperature but below the highest thermal transition temperature or it melting point. The permanent shape includes a size change which may be used to introduce prestresses to the structural component. In some embodiments, triple shape memory materials may be used, which can store two shapes in memory.

SMPs may be configured in numerous forms and shapes. The temperature needed for permanent shape recovery may be set at any suitable temperature such as between about −60 degrees C. to about 160 degrees C. Engineering the composition and the structure of the SMP may allow for the choice of the selected temperature for the particular application.

SMPs include, but are not limited to, thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Exemplary polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, and the like, and combinations comprising at least one of the foregoing polymer components. Examples of polyacrylates include poly(methyl methacrylate), poly(ethyl methacrylate), ply(butyl methacrylate), poly(isobutyl methacrylate), poly(hexyl methacrylate), poly(isodecyl methacrylate), poly(lauryl methacrylate), poly (phenyl methacrylate), poly(methyl acrylate), poly(isopropyl acrylate), poly(isobutyl acrylate) and poly(octadecyl acrylate).

Aside from strict shape recovery, any material that can be made to linearly expand or contract may be used for the preformed reinforcing component. For example, polyetheretherketone (PEEK) may be used to form the preformed reinforcing component. In some embodiments, it may be desirable to use a material to form the preformed reinforcing component having low density, at least about 60 MPa ultimate tensile strength, at least about 5 percent elongation at break, at least about 4 GPa modulus of elasticity low flexural yield strength and at least about 50 (Âμm/m-Â° C.) coefficient of thermal expansion. In some embodiments, the material may be used to produce an actuator by combining this material with a non-active elastic member. This may be referred to as a unimorph actuator. If both components are made of the same material but made to deform in opposite directions, the material becomes a bimorph.

In some embodiments, selection of the thermal transition temperature may depend on a number of factors. For example, it may be undesirable for the thermal transition temperature for the SMP to be around room temperature or otherwise at ambient temperature in a production environment. In some embodiments, it may be desirable for the transition temperature to correspond to a processing temperature for a vehicle formed using the vehicle structural members, such as those encountered in a vehicle assembly plant so that the reinforcing component can be processed along with the vehicle. While temperatures encountered in a vehicle assembly operation may be in the range of about 150 degrees C. to about 205 degrees C., body and paint shop application may be about 130 degrees C. or lower.

Figure 8:
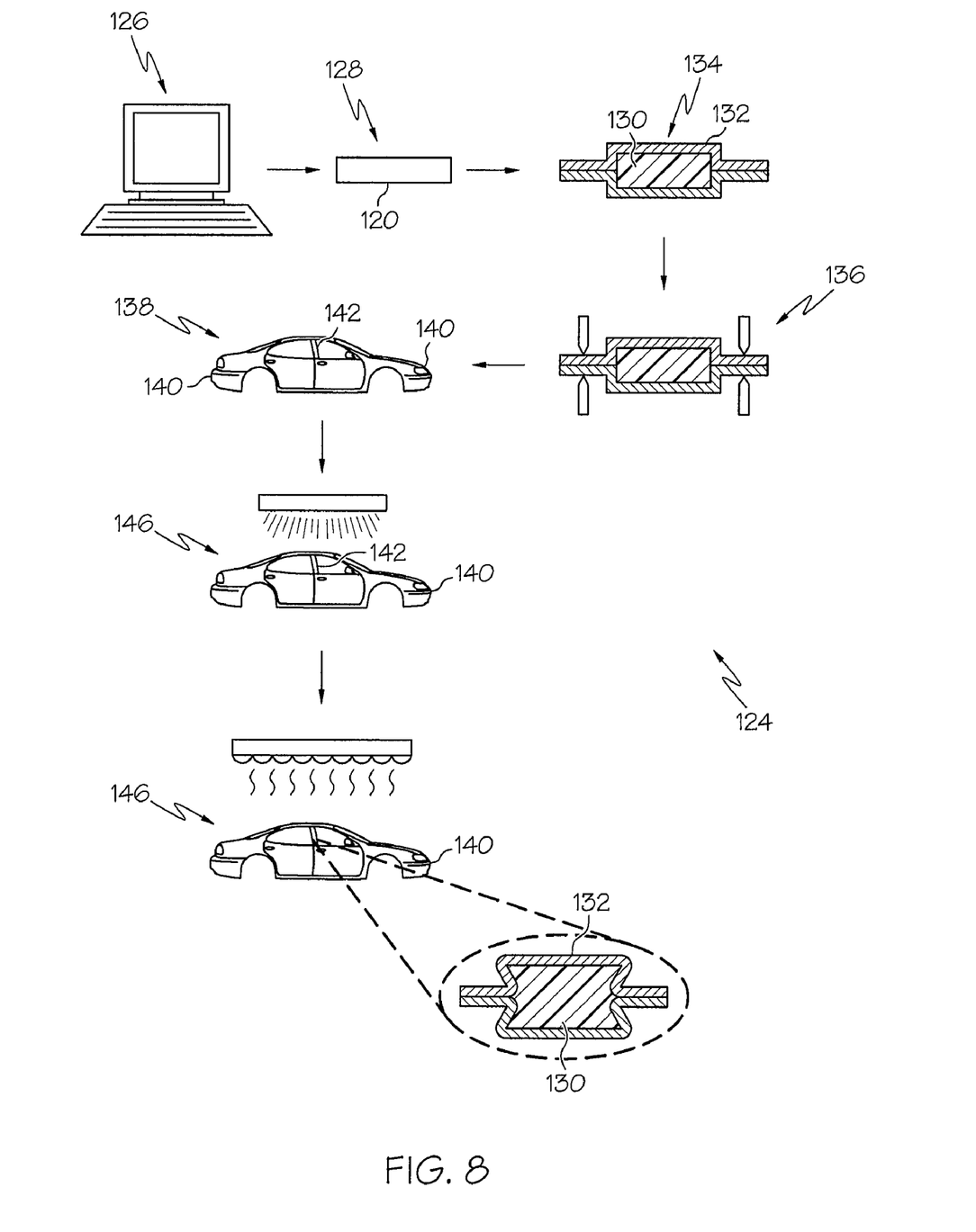
FIG. 8 schematically illustrates an embodiment of a method for forming a vehicle using a vehicle structural member.

Referring to FIG. 8, a method 124 for applying a vehicle structural member to a vehicle is shown. At step 126, an analysis is performed to identify at what locations a vehicle structural member would be in compression during use. At step 128, a reinforcing member 130 is formed using, for example, an SMP or other suitable plastic material. In embodiments using an SMP, the reinforcing member is set in a permanent shape and then in a temporary shape. In embodiments using other plastic material, the preformed reinforcing member 130 maybe set in a temporary shape. A structural component 132 is formed at step 134 and the reinforcing member 130 is placed in the structural component. The structural component 132 may be further processed after the reinforcing member 130 is applied thereto at step 136. In some embodiments, a resin may be used to adhere the reinforcing member to the structural component 132. At step 138, a vehicle 140 including the vehicle structural member 142 is assembled. The vehicle 140 may be painted at step 144. At step 146, the vehicle 140 is placed in an oven where temperatures reach between about 160 degrees C. and about 200 degrees C. In some embodiments, the temperature in the oven cross-links the plastic reinforcing member. The temperature in the oven may exceed the thermal transition temperature of the SMP, causing the reinforcing member 130 to change in size thereby introducing prestress to the structural component 132. In some embodiments, prestressing the structural component 132 can increase the load capacity of the vehicle structural member by at least about 30 percent.

Figure 9:
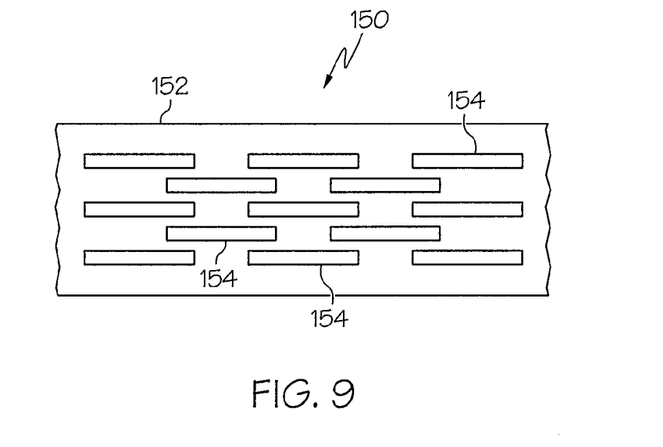
FIG. 9 illustrates another embodiment of a vehicle structural member.

Referring to FIG. 9, a vehicle structural member 150 includes a structural component 152 and multiple, isolated regions of reinforcing components 154 spread out over a length and a width of the structural component. As above, each reinforcing component 154 is formed of a size changing material.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A method of prestressing a vehicle structural member, the method comprising:
    forming a support structure;
    applying a first preformed reinforcing component to the support structure at a first location, the first preformed reinforcing component comprising a size changing material that increases in dimension upon application of a stimulus;
    applying a second preformed reinforcing component to the support structure at a second location, the second preformed reinforcing component comprising a size changing material that decreases in dimension upon application of the stimulus;
    transforming the first preformed reinforcing component from a first configuration where the size changing material of the first preformed reinforcing component has a first dimension to a second configuration where the size changing material of the first preformed reinforcing component has an increased second dimension;
    transforming the second preformed reinforcing component from a first configuration where the size changing material of the second preformed reinforcing component has a first dimension to a second configuration where the size changing material of the second preformed reinforcing component has a decreased second dimension;
    the first and second preformed reinforcing components being applied to the support structure such that transforming the first and second preformed reinforcing components from their first configurations to their second configurations increases stress in the support structure.

2. The method of claim 1, wherein the support structure is formed of a metal and the size changing material of at least one of the first and second preformed reinforcing components is a plastic.

3. The method of claim 2, wherein the size changing material of the at least one of the first and second preformed reinforcing components is a shape memory polymer.

4. The method of claim 3, wherein the shape memory polymer is in a temporary shape when applied to the support structure.

5. The method of claim 4 further comprising heating the shape memory polymer above a thermal transition temperature such that the shape memory polymer reverts to a permanent shape.

6. The method of claim 1, wherein the steps of transforming the first and second preformed reinforcing components include changing a length of the first and second preformed reinforcing components.

7. The method of claim 1, wherein transforming the first and second preformed reinforcing components from their first configurations to their second configurations increases stress in the support structure by about 60 MPa or more.

8. A prestressed vehicle structural member, comprising:
    a support structure; and
    a first preformed reinforcing component connected to the support structure with the first preformed support structure in a first configuration, the first preformed reinforcing component comprising a size changing material that increases in dimension upon application of a stimulus;
    a second preformed reinforcing component connected to the support structure with the second preformed support structure in a first configuration, the second preformed reinforcing component comprising a size changing material that decreases in dimension upon application of the stimulus;
    wherein the first preformed reinforcing component being transformed from the first configuration where the size changing material of the first preformed reinforcing component has a first dimension to a second configuration where the size changing material of the first preformed reinforcing component has a second, larger dimension;
    wherein the second preformed reinforcing component being transformed from the first configuration where the size changing material of the second preformed reinforcing component has a first dimension to a second configuration where the size changing material of the second preformed reinforcing component has a second, smaller dimension;
    the first and second preformed reinforcing components being connected to the support structure such that the first and second preformed reinforcing components cooperate to increase stress in the support structure with the first and second preformed reinforcing components in their second configurations.

9. The prestressed vehicle structural member of claim 8, wherein the support structure is formed of a metal and the size changing material of at least one of the first and second preformed reinforcing components is a plastic.

10. The prestressed vehicle structural member of claim 9, wherein the size changing material of the at least one of the first and second preformed reinforcing components is a shape memory polymer.

11. The prestressed vehicle structural member of claim 10, wherein the shape memory polymer is in a temporary shape when connected to the support structure.

12. The prestressed vehicle structural member of claim 8, wherein a length of the first and second preformed reinforcing components changes from their first configurations to their second configurations.

13. A method of vehicle assembly using a vehicle structural member, the method comprising:
   forming a support structure;
   forming a first reinforcing component of a shape memory polymer having a permanent shape and a temporary shape;
   forming a second reinforcing component of a shape memory polymer having a permanent shape and a temporary shape, where the permanent shape of the shape memory polymer of the second reinforcing component is different from the permanent shape of the shape memory polymer of the first reinforcing component;
   applying the first reinforcing component in the its temporary shape to the support structure;
   applying the second reinforcing component in its temporary shape to the support structure;
   applying the vehicle structural member to a vehicle during vehicle assembly; and
   transforming the first reinforcing component from its temporary shape to its permanent shape;
   transforming the second reinforcing component from its temporary shape to its permanent shape;
   wherein the first and second reinforcing components cooperating such that transforming the first and second reinforcing components from their temporary shapes to their permanent shapes increases stress in the support structure.

14. The method of claim 13, wherein the steps of transforming the first and second reinforcing components comprises heating the first and second reinforcing components above a thermal transition temperature.

15. The method of claim 13, wherein the steps of transforming the first and second reinforcing components include changing a length of the first and second reinforcing components.

* * * * *

UNITED STATES PATENT AND TRADEMARK OFFICE
CERTIFICATE OF CORRECTION

PATENT NO. : 8,167,363 B2
APPLICATION NO. : 12/424061
DATED : May 1, 2012
INVENTOR(S) : Umesh N. Gandhi It is certified that error appears in the above-identified patent and that said Letters Patent is hereby corrected as shown below:

Claim 13, column 9, line 13, change "component in the its" to "component in its"

Signed and Sealed this
Third Day of July, 2012

David J. Kappos
*Director of the United States Patent and Trademark Office*